United States Patent [19]

Brandestini

[11] 4,068,963
[45] Jan. 17, 1978

[54] MEANS ANCHORING A BUNDLE OF WIRES IN A SOCKET

[75] Inventor: Antonio Brandestini, Kusnacht, Switzerland

[73] Assignee: Bureau BBR Ltd., Zurich, Switzerland

[21] Appl. No.: 763,093

[22] Filed: Jan. 27, 1977

[30] Foreign Application Priority Data

Feb. 9, 1976 Switzerland ................. 1546/76

[51] Int. Cl.² ......................................... B25G 3/34
[52] U.S. Cl. ................................. 403/268; 403/291; 403/361; 52/223 L
[58] Field of Search ............... 403/41, 14, 268, 269, 403/275, 291, 361; 24/122.6; 52/230, 223 L

[56] References Cited

U.S. PATENT DOCUMENTS

| 2,637,895 | 5/1953 | Blaton | 52/230 X |
|---|---|---|---|
| 2,751,660 | 6/1956 | Nakonz | 52/230 X |
| 3,195,939 | 7/1965 | Lagarde et al. | 403/268 |
| 3,309,744 | 3/1967 | Sironi et al. | 52/223 L X |
| 3,498,013 | 3/1970 | Kern | 52/230 X |
| 3,672,712 | 6/1972 | Davis | 403/268 |
| 3,833,706 | 9/1974 | Edwards | 52/230 X |
| 3,866,273 | 2/1975 | Brandestini et al. | 52/223 L X |

FOREIGN PATENT DOCUMENTS

| 837,817 | 1970 | Canada | 403/268 |
|---|---|---|---|
| 1,093,323 | 1967 | United Kingdom | 52/230 |

*Primary Examiner*—Wayne L. Shedd

[57] ABSTRACT

An anchoring arrangment for anchoring a bundle of wires in an anchoring means, such as an anchoring head or anchoring sleeve comprising a support body provided at the exit side of the bundle of wires from the anchoring means, the bundle of wires extending through said support body. The support body possesses a support surface provided with friction-reducing means. The support surface, viewed in longitudinal section, widens outwardly in a substantially curved-shaped configuration.

20 Claims, 3 Drawing Figures

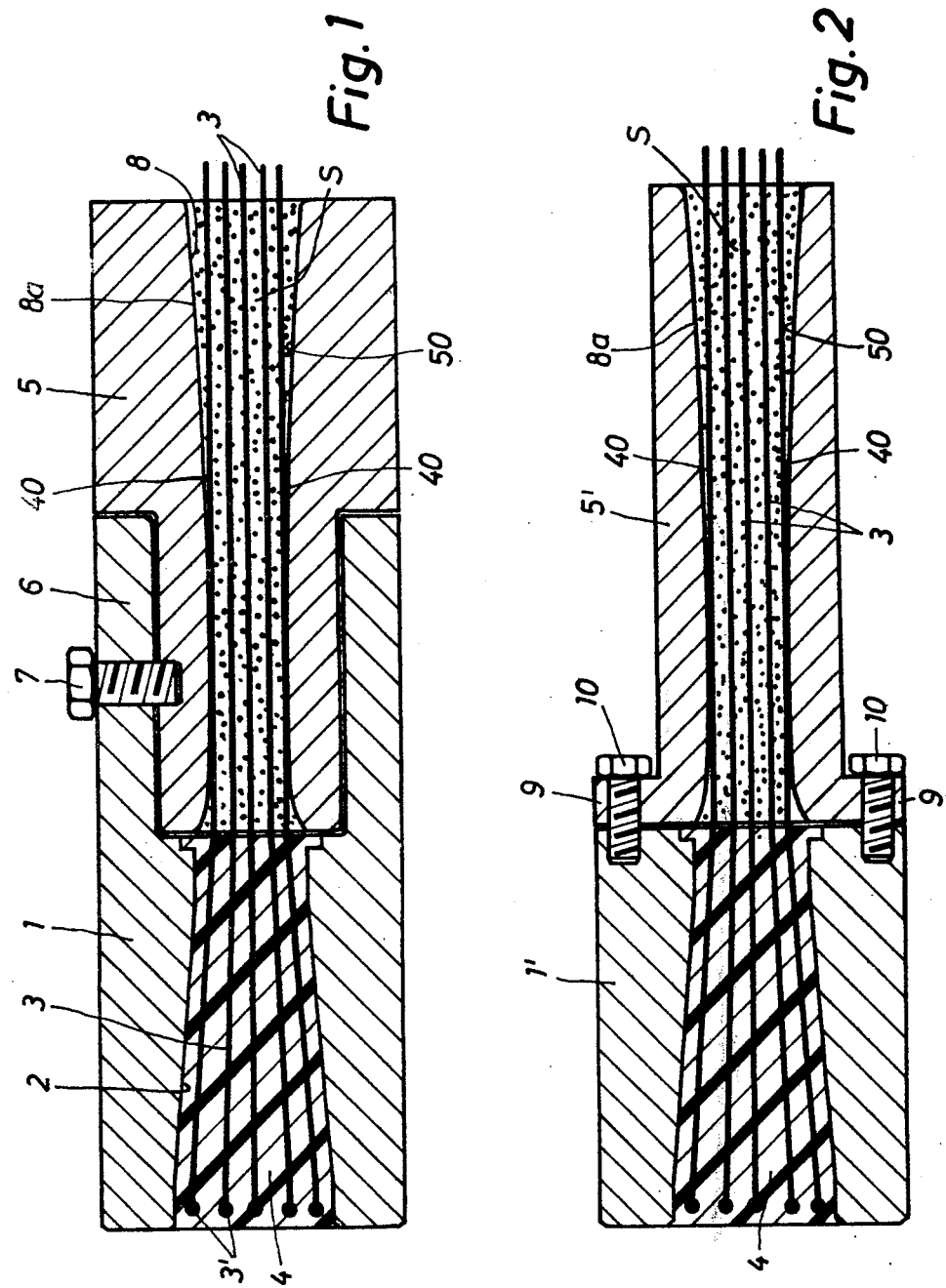

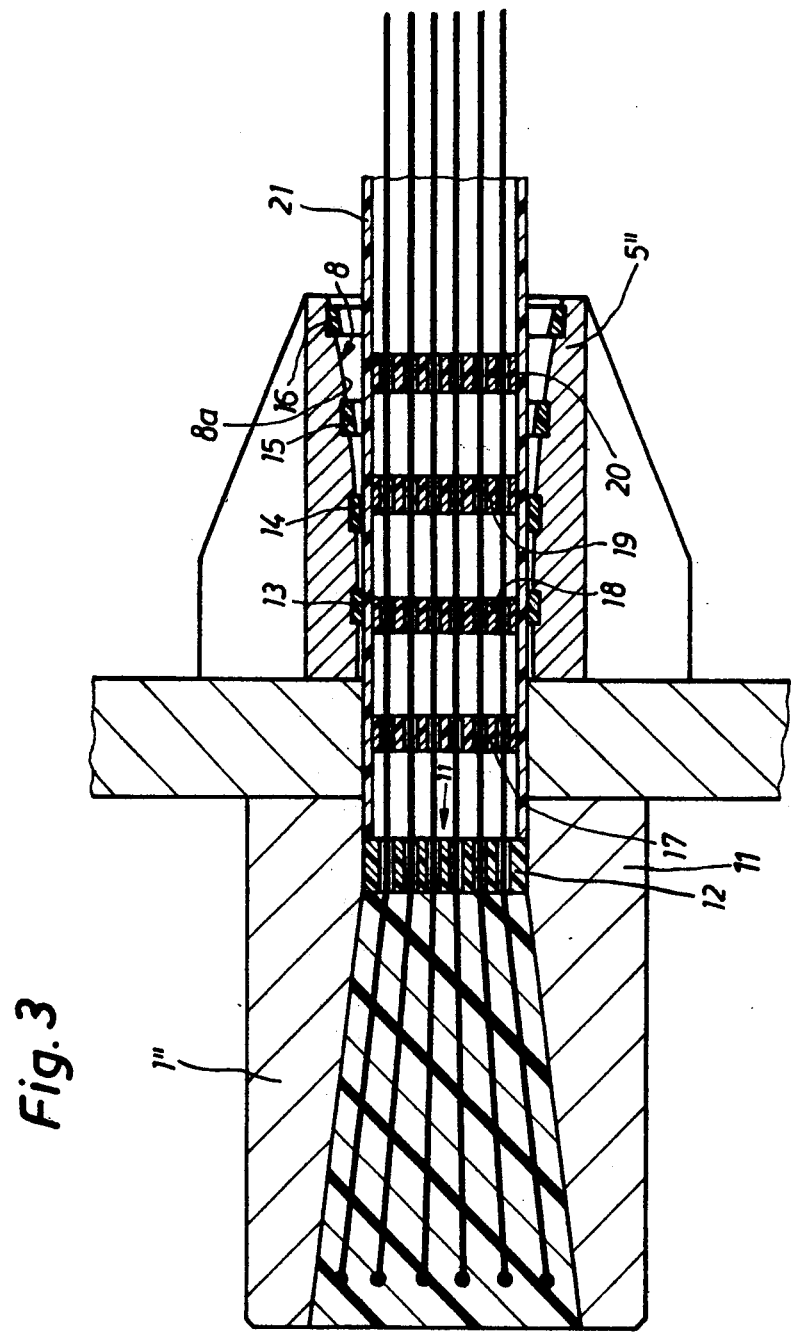

MEANS ANCHORING A BUNDLE OF WIRES IN A SOCKET

BACKGROUND OF THE INVENTION

The present invention relates to a new and improved construction of an anchoring arrangement for anchoring a dynamically loaded bundle or bunch of wires in an anchoring means, such as an anchoring head or anchoring sleeve. The wires of such wire bundle can serve, for instance, for anchoring off-shore structures.

Due to the action of the waves in the sea, the anchoring cables are exposed, at the location of exit from the anchoring head, to pronounced dynamic loads and deflection forces. Hence, at these locations particular protective measures are needed.

SUMMARY OF THE INVENTION

Hence, it is a primary object of the present invention to provide an improved construction of anchoring arrangement for anchoring a bundle of wires in an anchoring means, such as an anchoring head or anchoring sleeve, in a manner not associated with the aforementioned drawbacks.

Another and more specific object of the present invention aims at providing an anchoring arrangement for anchoring a bundle of wires in an anchoring means, such as an anchoring head or anchoring sleeve, in a manner safeguarding against the application of excessive deflection forces and dynamic loads at the wires at the location where the same exit from the anchoring means.

Now in order to implement these and still further objects of the invention, which will become more readily apparent as the description proceeds, the anchoring arrangement of this development is manifested by the features that at the exit or outlet side of the bundle of wires from the anchoring head or anchoring sleeve there is provided a support body through which the bundle of wires extends. This support body has a support surface provided with friction-reducing means, and the support surface, viewed in longitudinal section, diverges or widens outwardly in a substantially curved-shaped configuration. The bundle of wires is supported by the guiding construction of the support body in such a manner that it is not exposed to any damaging loading at the location where such bundle of wires departs from the anchoring head or the like.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a longitudinal sectional view of a first simplified construction of anchoring arrangement constructed according to the present invention;

FIG. 2 is a similar longitudinal sectional view of a second embodiment of anchoring arrangement; and FIG. 3 is a further exemplary embodiment of anchoring arrangement constructed according to the invention, likewise shown in longitudinal sectional view.

DETAILED DESCRIPTION OF THE PREFERRED EMBODIMENTS

Describing now the drawings, the anchoring arrangement shown by way of example in FIG. 1 will be understood to comprise an anchoring means, in the form of an anchoring head or anchoring sleeve 1 (hereinafter usually simply referred to as anchoring head) possessing a substantially conical bore 2 in which there are anchored the spread apart end regions of a bundle or bunch or wires 3. These wires 3 are enlarged at their ends, as indicated by reference character 3', and embedded in any suitable mass of material 4. The wires 3 departing as a bundle or bunch out of the anchoring head 1 can be utilized, for instance, as dynamically loaded tensioning wires, for instance as an anchoring cable for off-shore structures, such as drilling platforms, or for bridge cables and the like. It has been found that these wires 3 are easily ruptured or damaged at the exit location from the anchoring head 1 if they bend or buckle at the region of their outlet edges. In order to avoid this defect, the invention contemplates mounting at the anchoring head 1 a support body 5 which is pushed into a substantially cylindrical projection or extension 6 of the anchoring head 1 and held in place by suitable fastening means, such as by being fixedly threaded by means of one or more screws or threaded bolts 7 or equivalent structure.

Continuing, it will be noted that the support body 5 possesses a guide bore 8 through which piercingly extends the bundle of wires 3. This guide bore 8, as seen, increases in size i.e. diverges outwardly in a substantially trumpet-shaped configuration from a diameter which approximately corresponds to the diameter of the bundle of wires, so that the wire bundle, when not exactly aligned with the lengthwise axis of the anchoring head 1, is supported in the bore 8, and the wires 3 are not loaded more excessively at the outlet location from the anchoring head 1. The individual wires 3 of the bundle may be provided at the region of the guide or supporting zone of the guide bore 8 with a layer or coating of a friction-reducing medium, such as a suitable plastic coating or covering, generally indicated by reference character 40. The bundle of wires 3 is elastically supported in the bore 8 of the support body 5, for instance embedded in an elastic supporting medium S, such as any suitable plastic mass. The support body 5 forms at the wall of the guide bore 8 a support surface 8a which is provided with a suitable friction-reducing agent or means, for instance a continuous lubricating layer, such as a plastic or burned enamel layer or a graphite lacquer coating, generally indicated by reference character 50. The well known product "TEFLON" may be used to form the plastic layer or coating. Also, it is here mentioned, that it would be possible to construct the anchoring head 1 and support body 5 of one piece.

With the modified exemplary embodiment shown in FIG. 2, the anchoring head 1' is not provided with the cylindrical projection or extension 6, as was the case for the arrangement of FIG. 1, and the support body 5' will be seen to possess a radial flange 9 or the like secured by suitable fastening means, such as screws or threaded bolts 10 at the anchoring head 1'. In all other respects, this embodiment corresponds to that of FIG. 1, and its function is the same.

FIG. 3 illustrates another embodiment of an anchoring arrangement in schematic longitudinal sectional view. The individual wires 3 of the wire bundle are secured in the anchoring head 1" just as was the case for the embodiments of FIGS. 1 and 2. At the outlet or exit end or region 11 of the anchoring head 1" there is provided a spacer body in the form of a perforated or apertured plastic disk or plate 12 which guides and retains the individual wires 3 in a predetermined position. The actual support body 5" likewise possesses a guide or supporting bore 8 and is arranged in spaced but predetermined position with respect to the anchoring head 1". At the inner wall of the bore 8 which forms the support surface 8a there are embedded elastic support rings 13, 14, 15 and 16 formed of a suitable friction-reducing medium, such as plastic. These rings 13 – 16 serve for supporting the dynamically loaded wires 3. Suitable for use as the plastic for forming rings 13 – 16 is polyethylene or the well known product "DELRIN" by way of example. The wires 3 themselves are also supported at the region of the support body 5 by means of the spacer bodies or elements 17, 18, 19 and 20.

The bundle of wires 3 can be furthermore guided from the location of exit out of the anchoring head 1" until exit out of the support body 5" by means of an encasing tube or pipe 21, for instance formed of plastic which, in turn, can be filled with an elastic support medium, such as the plastic mass S of FIGS. 1 and 2, or in which there can be arranged the spacer bodies 17 – 20 which engage at the bundle of wires 3.

By means of the above-described anchoring arrangements, there is achieved the beneficial result that the wires of the anchored wire bunch or bundle, at the location of exit out of the anchoring construction, are not exposed to any loads which impair the strength of such wires, and this is so with every, even also during maximum deflection.

Finally, it is here of course mentioned that where appropriate individual features of one embodiment may be also used in another embodiment.

While there are shown and described present preferred embodiments of the invention, it is to be distinctly understood that the invention is not limited thereto, but may be otherwise variously embodied and practiced within the scope of the following claims. Accordingly,

What is claimed is:

1. An anchoring arrangement for anchoring a bundle of wires in an anchoring head, comprising:
    an anchoring head through which extends the bundle of wires;
    said bundle of wires departing from the anchoring head at an exit side theeof;
    a support body provided at the exit side of said anchoring head and through which extend said bundle of wires;
    said support body having a support surface equipped with friction-reducing means;
    said support surface, viewed in longitudinal sectional view, outwardly widening in a substantially curved-shaped configuration.

2. The anchoring arrangement as defined in claim 1, wherein:
    said anchoring head includes a substantially cylindrical projection located at the exit side of the bundle of wires from said anchoring head;
    said support body being inserted in said substantially cylindrical projection of the anchoring head;
    and means for securing the support body in said substantially cylindrical projection.

3. The anchoring arrangement as defined in claim 2, wherein:
    said fastening means comprise screw means.

4. The anchoring arrangement as defined in claim 1, wherein:
    said support body includes flange means;
    means for attaching said flange means to said anchoring head at the exit location of the bundle of wires from the anchoring head.

5. The anchoring arrangement as defined in claim 4, wherein:
    said attaching means comprise screw means.

6. The anchoring arrangement as defined in claim 1, wherein:
    said friction-reducing means comprises a continuous lubricating layer provided at the support surface.

7. The anchoring arrangement as defined in claim 6, wherein:
    said lubricating layer comprises a plastic layer.

8. The anchoring arrangement as defined in claim 1, wherein:
    said friction-reducing means comprises individual friction-reducing support elements arranged at said support surface.

9. The anchoring arrangement as defined in claim 8, wherein:
    said support elements are formed of plastic and embedded in said support surface.

10. The anchoring arrangement as defined in claim 8, wherein:
    said support elements comprise substantially ring-shaped members formed of a friction-reducing material.

11. The anchoring arrangement as defined in claim 10, wherein:
    said friction-reducing material is plastic.

12. The anchoring arrangement as defined in claim 1, further including:
    a spacer body for guiding the individual wires of the bundle of wires upon exit from the anchoring head.

13. The anchoring arrangement as defined in claim 12, wherein:
    said spacer body comprises an apertured plastic disk.

14. The anchoring arrangement as defined in claim 1, further including:
    spacer bodies provided for the individual wires of the bundle of wires within said support body.

15. The anchoring arrangement as defined in claim 1, wherein:
    said friction-reducing means comprises a friction-reducing mass of material in which there is embedded the bundle of wires after departure from the anchoring head and at least over the effective supporting length of the support body.

16. The anchoring arrangement as defined in claim 15, wherein:
    said friction-reducing mass of material is composed of plastic.

17. The anchoring arrangement as defined in claim 15, further including:
    an encasing tube for the bundle of wires;
    said encasing tube extending through the support body;
    said mass of material being located within said encasing tube.

18. The anchoring arrangement as defined in claim 17, wherein:

said encasing tube extends from the anchoring head through said support body.

19. The anchoring arrangement as defined in claim 1, wherein:

the individual wires of the bundle of wires are provided at least at a supporting region of the support body with a layer of a friction-reducing material.

20. An anchoring arrangement for anchoring a bundle of wires in an anchoring means, comprising:

anchoring means through which extends the bundle of wires;

said bundle of wires departing from the anchoring means at an exit side thereof;

a support body carried at the exit side of said anchoring means and through which extend said bundle of wires;

said support body having a support surface equipped with friction-reducing means;

said support surface, viewed in longitudinal sectional view, outwardly diverging.

* * * * *